(12) United States Patent
Hirakata

(10) Patent No.: US 7,077,033 B2
(45) Date of Patent: Jul. 18, 2006

(54) SOCKET WRENCH FOR POWER TOOL

(75) Inventor: Yuji Hirakata, Kyoto (JP)

(73) Assignee: Kyoto Tool Co., Ltd., Kyoto (JP)

( * ) Notice: Subject to any disclaimer, the term of this patent is extended or adjusted under 35 U.S.C. 154(b) by 157 days.

(21) Appl. No.: 10/489,600

(22) PCT Filed: Sep. 30, 2002

(86) PCT No.: PCT/JP02/10201

§ 371 (c)(1),
(2), (4) Date: Mar. 15, 2004

(87) PCT Pub. No.: WO03/031121

PCT Pub. Date: Apr. 17, 2003

(65) Prior Publication Data

US 2004/0237730 A1    Dec. 2, 2004

(30) Foreign Application Priority Data

Oct. 3, 2001    (JP) ............................. 2001-307306

(51) Int. Cl.
*B25B 13/06* (2006.01)
*B25G 3/18* (2006.01)
*F16B 21/00* (2006.01)

(52) U.S. Cl. ................. 81/124.6; 81/177.85; 403/318; 403/324; 403/379.2

(58) Field of Classification Search ............... 81/121.1, 81/124.5, 124.6, 177.85; 403/324, 318, 379.2
See application file for complete search history.

(56) References Cited

U.S. PATENT DOCUMENTS

| | | | | |
|---|---|---|---|---|
| 2,304,038 A | * | 12/1942 | Thompson | 403/324 |
| 2,326,317 A | * | 8/1943 | Amtsberg | 403/318 |
| 3,549,160 A | * | 12/1970 | Etzkorn | 279/97 |
| 3,832,916 A | * | 9/1974 | Schoeps | 81/464 |
| 4,266,453 A | * | 5/1981 | Farley | 81/177.85 |
| 4,448,564 A | * | 5/1984 | Orszulak | 403/318 |
| 4,477,096 A | * | 10/1984 | Wallace et al. | 403/318 |
| 5,018,953 A | * | 5/1991 | Matsubara et al. | 403/318 |

* cited by examiner

*Primary Examiner*—Hadi Shakeri
(74) *Attorney, Agent, or Firm*—Snider & Associates; Ronald R. Snider

(57) ABSTRACT

This invention discloses device for a socket wrench to be firmly and fixedly combined with a motive tool, where the socket wrench is prevented from falling off from the combining during use. A pin insertion hole is formed in a blind hole with its one end as a closing portion and thus center of gravity for the pin is established toward at the closing portion far from center of the socket wrench whereby shock and excess force are absorbed in this new center of gravity, whereas the combing pin can be surely maintained at the seat avoiding from the condition in which the socket wrench and the motive tool are not separated off with firm combining.

2 Claims, 2 Drawing Sheets

SOCKET WRENCH FOR POWER TOOL

BACKGROUND OF THE INVENTION

1. Field of the Invention

This invention relates to a mechanism of a socket wrench wherein the socket wrench is firmly equipped and combined with an inside anvil of a motive tool such as an impact wrench.

2. Description of the Related Art

As a motive tool operated by human power, there is a ratchet handle or an extension bar, and it is generally seen that a combination mechanism between a socket wrench and the motive tool is performed by pushing a hard steel ball into a hollow portion of square hole formed in the socket wrench, while the steel ball is prepared in the anvil of the motive tool by a spring force. Where the socket wrench is small and of light weight, this combination is kept well, but where the wrench is large and of heavy weight, the wrench is eventually easy to be fallen off naturally because of the heavy weight in the due course. Even if the good combination is kept in the beginning, when the combined tool is moved or shaken, the combination is sometimes released. Especially during working time in a narrow place, when this disconnection happens, it results only the socket wrench has fallen off to remains on a bolt-nut side, and it is quite troublesome to find the lost wrench.

With regard to the motive tool of an impact wrench moved by compressed air or electric power, the combination between the socket wrench and the anvil is generally held by utilizing a pin which is penetrating through both the socket wrench and the anvil and by inserting fixedly an O-ring into a ditch formed in circumference of the socket so as to maintain the combination during high speed rotation. In this constitution, however, the O-ring made of rubber is forcibly pressed and spread by centrifugal force or hitting shock caused by the high speed rotation of the socket wrench, and thus it is difficult to maintain the pin.

In order to keep the pin not to be scattered off easily, it is suggested to adopt rubber with high hardness for the O-ring, but if we use this high harness rubber, it becomes very difficult to take the O-ring out of the socket ditch when needed, and also we have to prepare an extra jig so that we may detach smoothly the socket wrench from the motive tool.

On the other hand, it is now marketed to use an E-letter ring made of piano wire in stead of the pin, but when we adopt this E-ring, an extra jig is absolutely required to take of the ring, and also this developed E-ring is sometimes broken off during use by hysteresis imposed by the continual blow caused on the impact wrench.

BRIEF SUMMARY OF THE INVENTION

The present invention provides a socket wrench to be combined with a motive tool, wherein an anvil of the motive tool is to be surely combined with the socket wrench without receiving any bad influence caused by heavy weight of the socket or by centrifugal force imposed by a high speed rotation, and at the same time this combination shall be easily released by simple operation when needed.

In the first place, this invention has an object to provide the following device: In a square hole of the socket wrench a pin insertion hole is established with one end of the hole closed as a blind hole, and the anvil is adjusted to be fitted into the square hole, while the combining pin is inserted into the pin insertion hole so that center of gravity for the pin may be formed toward the closed side far from center of the socket wrench, and into a space of the pin insertion hole caused by shifting the center of gravity, a projecting portion of a fixed ring is inserted into the insertion hole while this portion is formed so that the portion has a proper length preventing the insertion pin from freely moving, and then the ring is fixedly fitted around the circumference of the socket wrench so as to maintain the pin on the fixed seat, and by this action as the center of gravity for the pin stays toward far from the center of the socket wrench, the centrifugal force of the combining pin caused by the rotation of the socket wrench is to directed toward the closed side, whereon the scattering of the pin is prevented during rotation of the socket wrench.

Secondly, the invention has the other object to set the center of the gravity for the combining pin toward far from the center of the gravity for the socket wrench on the closed side by changing the shape of the pin or changing the material of the pin, wherein a ring with a projecting portion is formed on the circumference of the socket wrench in order to maintain fixedly the pin on the required seat.

DETAILED DESCRIPTION OF THE INVENTION

Now, the preferred embodiment is explained as below.

Figure 1:
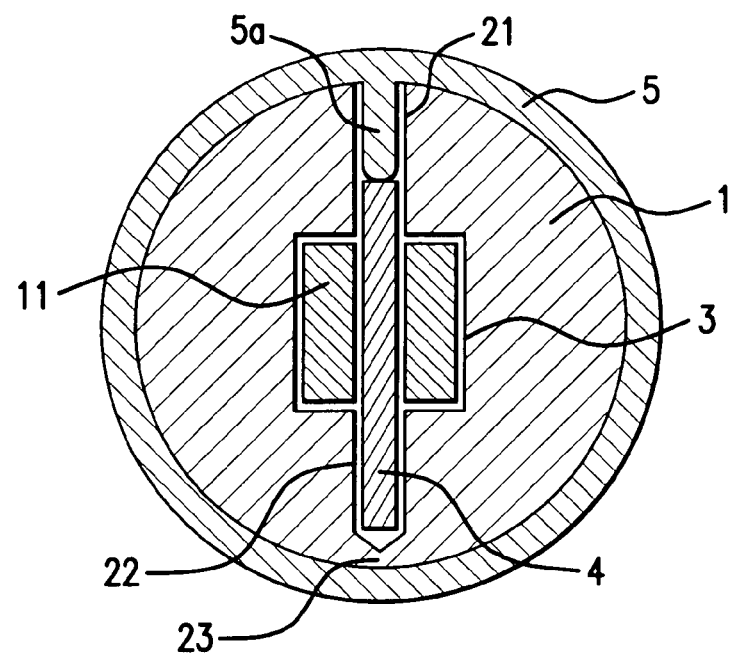
FIG. 1 is a sectional view of a socket wrench for a motive tool with a first embodiment of the present invention.
Figure 2:
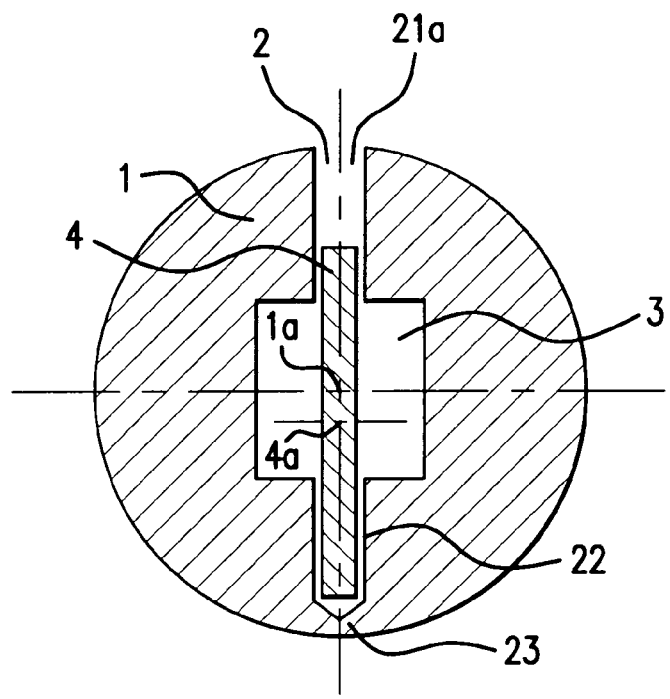
FIG. 2 is a sectional view of the socket wrench, wherein center line of the socket wrench and that of a pin are shown in the condition that an O-ring is not prepared in the first embodiment.

With reference to FIG. 1 and FIG. 2, a pin insertion hole (2) is formed in a square hole (3) of a socket wrench (1) vertically against its axis direction, and this insertion hole (2) is a blind hole with a penetrating hole (21) on one end and with a closed portion (23) on the other end. Into the square hole (3), an anvil (11) of a motive tool is fitted and a combining pin (4) is inserted into the insertion hole (2) so that the socket wrench (1) can be combined with the anvil (11).

One end of the combining pin (4) is pushed until it contacts to the closed portion (23), while center of gravity (4a) for the pin (4) is established between a center (1a) of the socket wrench (1) and the closed portion of (23). In order to attain this condition, the combining pin (4) shall be set in its distance shorter than twice value of length produced by length of a radius for the socket wrench (1) deducting from length of the closed portion (23), and this obtained distance should run through a border line between the anvil (11) and the socket wrench (1). When the combining pin (4) is set to the distance as above defined, the center of gravity (4a) for the combining pin (4) can be established between the center (1a) of the socket wrench (1) and the closed portion (23), even if the pin is adopted from a general pin having an uniform balanced weight in column shape.

In the circumference of the socket wrench (4), an O-ring (5) having a projection portion (5a) is set. This projection portion (5a) shall have its length in the condition where the combining pin (4) does not freely move in a space (21a) which is produced by the establishment of the center of gravity (4a) for the pin (4), and the combining pin (4) is put into the pin insertion hole (2). When the projection portion (5a) is put into the insertion hole (2), the space (21a) is erased by a lid of the portion (5a), and thus the combining pin (4) is fixed and prevented from falling off while the place on the center of gravity can be maintained.

According to the explained embodiment, the center of gravity for the pin (4) always stays in the center between the center of the socket wrench (1) and the closed portion (23). Thus, even if some large centrifugal force by the use of the motive tool is produced, that force is mainly imposed on the closed portions only, and thus the O-ring (5) is not imposed for the force, so that the combining pin (4) shall be prevented from scattering out and the work can be continued with safety. At the same time, as small imposition of the force on the O-ring (5), its quality is not to be deteriorated.

Figure 3:
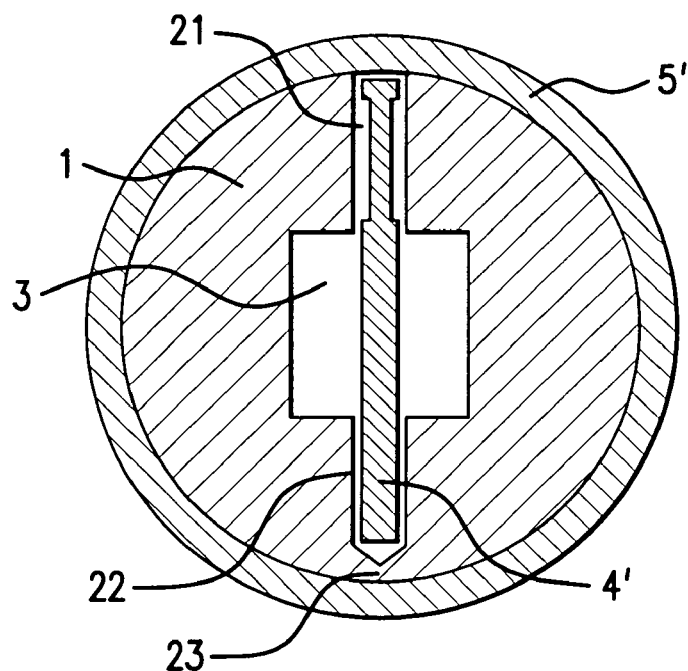
FIG. 3 is a sectional view of the socket wrench combining with the motive tool with a second embodiment of the invention.
Figure 4:
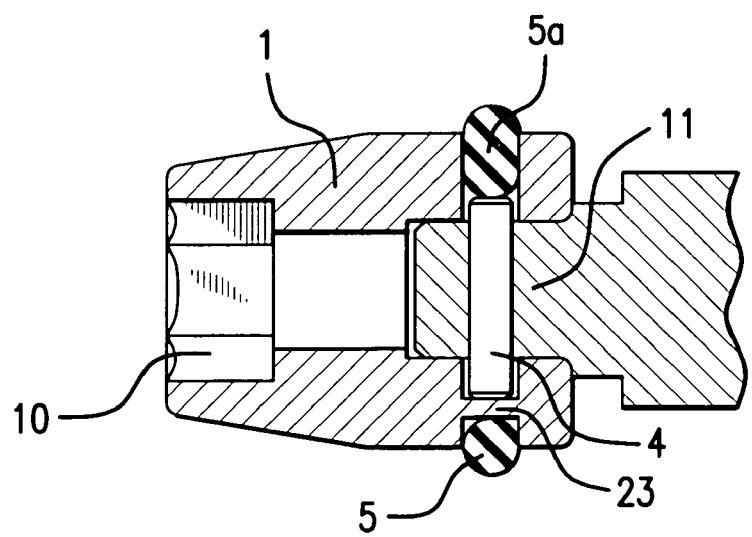
FIG. 4 is a longitudinal sectional view of the socket wrench for the motive tool with the first embodiment.

The other embodiment is now explained. With reference to FIG. 3, the shape of the combining pin (4') is transformed, whereby the center of gravity is established between the center of the socket wrench (1) and the closed portion (23). In order to change the center of gravity for the combining pin (4'), it is not limited to adopt the above transformation at all. In other words, there are many other examples wherein you may adopt the pin (4') with assembling of more than two materials which have different specific gravity, or you may adopt the pin (4') having different diameter not in same diameter, or else you may adopt the pin (4'), one part of which is shaped in a hollow. In case if you adopt these examples, the total length of the pin (4') is not limited to the first embodiment as already explained. The total length of the pin (4') required may have to surely combine the socket wrench (1) with the anvil (11) and the length can be inserted to contact to the closed portion (23) but it must not extend over the pin insertion hole (2).

When we adopt this method, the length of the combining pin (4') is exactly same as that of the pin insertion hole (2), but the center of gravity for the pin (4') shall be established between the center of the socket wrench (1) and the closed portion (23), while an O-ring (5') without an projecting portion is set on the circumference of the socket wrench (1) so as to maintain a fixed position for the center of gravity for the combining pin (4').

This invention is not limited to the above descriptions. For example, the closed portion (23) is not necessary for the complete closing, but you may prepare a projection portion in the inside of the pin insertion hole (2) at one end, which prevents the pin (4') from falling off in the fixed position even if the hole (2) is penetrated through. The material or the shape for the combining pin (4, or 4') and the O-ring (5 or 5') can be freely changed, and a ditch on the circumference of the socket wrench (1) can be formed in order to confirm firm combining thereof.

It is further understood by those skilled in the art that the foregoing description is preferred embodiment of the disclosed goods and that various changes and modifications may be made in this invention without departing from the spirit and scope thereof.

INDUSTRIAL APPLICABILITY

The first invention has developed device for combining a socket wrench with a motive tool, wherein center of gravity for a combining pin (4) is shifted from a center of the socket wrench (1a) toward to a closed portion (23), which results that centrifugal force of the pin (4) caused by rotation of the socket wrench (1) during working time of the motive tool is imposed only on the closed portion (23), and the combining pin (4) is prevented from scattered off so that an anvil (11) of the motive tool and the socket wrench (1) may be ensured for the safe combining. In a prior art, the pin (4) shall be scattered off because a O-ring (5) receives excess force by the rotation as explained above. By this device, the O-ring (5) avoids the excess force so that the ring (5) may be much more durable with less deterioration. At the same time, this invention provides the device in a simple construction and in a almost similar cost with a prior device, and moreover this device does not need any new extra jig nor tool at all and its working efficiency is exactly maintained as had.

The second invention has same effect as the first invention. A new shape and an adoption of new materials for the combining pin (4) have realized to shift the center of gravity for the pin (4) toward to the closed portion (23), while the pin (4) is prepared in the same length of a pin insertion hole (2), whereas it is not necessary to form a projection portion (5a) for the O-ring (5), and thus a normal O-ring developed by a prior art can be smoothly used.

As so far explained, industrial applicability by this invention shall be highly appreciated.

EXPLANATIONS OF THE USED NUMERALS

1. Socket Wrench
1a. Center of Socket Wrench
2. Pin Insertion Hole
21. Penetrating Hole
21a. Space
22. Blind Hole
23. Closed Portion
3. Square Hole
4. Combining Pin
4a. Center of Gravity for the Pin
4' Combining Pin
5. O-Ring
5' O-Ring
5a. Projecting Portion
10. Bolt and Nut Combing Portion
11. Anvil

What is claimed is:

1. A socket wrench which is combined with an anvil of a motive tool:
   wherein the socket wrench has a pin insertion hole which receives a combining pin; wherein the combining pin is fixedly maintained by a ring which surrounds a circumference of the socket wrench;
   wherein one end of the pin insertion hole is closed as a blind hole;
   wherein the anvil of the motive tool is fixed into a square hole of the socket wrench by the combining pin;
   wherein the combining pin is inserted into the pin insertion hole;
   wherein a center of gravity for the combining pin is arranged to be established between a closing portion of the blind hole and a center line of the socket wrench;
   wherein a projection portion is formed on the ring and extends into a space of the pin insertion hole;
   wherein the space is between the ring and an end of the pin which is opposite to the closing portion of the blind hole;
   wherein length of the projection portion prevents the pin from freely moving in the space;
   wherein the ring maintains a position of the pin;

wherein centrifugal force caused by rotation of the socket wrench is imposed toward a direction of the closing portion of the blind hole because the center of gravity of the combining pin is to the closing side of the pin from the center line of the socket wrench; and wherein the pin is prevented from moving towards the end of the pin which is opposite to the closing portion of the blind hole during the rotation of the socket wrench.

2. A socket wrench which is combined with an anvil of a motive tool:

wherein the socket wrench has a pin insertion hole which receives a combining pin; wherein the combining pin is fixedly maintained by a ring portion which surrounds a circumference of the socket wrench;

wherein one end of the pin insertion hole is closed as a blind hole;

wherein the anvil of the motive tool is fixed into a square hole of the socket wrench by the combining pin;

wherein the combining pin is inserted into the pin insertion hole;

wherein a center of gravity for the combining pin is arranged to be established between a closing portion of the blind hole and a center line of the socket wrench;

wherein the space is between the ring and an end of the pin which is opposite to the closing portion of the blind hole;

wherein centrifugal force caused by rotation of the socket wrench is imposed toward a direction of the closing portion of the blind hole because the center of gravity of the combining pin is to the closing side of the pin from the center of the socket wrench;

wherein the pin is prevented from moving towards the end of the pin which is opposite to the closing portion of the blind hole during the rotation of the socket wrench;

wherein the pin is inserted into the pin insertion hole until one end contacts the closing end portion of the blind hole;

wherein the pin extends from the closing portion of the blind hole to an outer circumference of the socket wrench;

wherein the ring portion is set to the outer circumference of the socket wrench; and wherein the seat of the pin is fixedly maintained.

* * * * *